US012589719B2

(12) United States Patent

Kulkarni

(10) Patent No.: US 12,589,719 B2

(45) Date of Patent: Mar. 31, 2026

(54) REMOTE CONTROL OF A BRAKE CONTROLLER FOR A TOWED VEHICLE

(71) Applicant: HORIZON GLOBAL AMERICAS INC., Plymouth, MI (US)

(72) Inventor: Chandrakumar D. Kulkarni, Battle Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 44 days.

(21) Appl. No.: 17/772,190

(22) PCT Filed: Nov. 2, 2020

(86) PCT No.: PCT/US2020/058530

§ 371 (c)(1),
(2) Date: Apr. 27, 2022

(87) PCT Pub. No.: WO2021/087451

PCT Pub. Date: May 6, 2021

(65) Prior Publication Data

US 2022/0402468 A1 Dec. 22, 2022

(51) Int. Cl.
*B60T 7/16* (2006.01)
*B60T 7/20* (2006.01)
(Continued)

(52) U.S. Cl.
CPC .................. *B60T 7/16* (2013.01); *B60T 7/20* (2013.01); *B60T 8/1708* (2013.01); *B60T 8/172* (2013.01);
(Continued)

(58) Field of Classification Search
CPC . B60T 7/16; B60T 7/20; B60T 8/1708; B60T 8/172; B60T 8/885
See application file for complete search history.

(56) References Cited

U.S. PATENT DOCUMENTS 9,738,125 B1 8/2017 Brickley et al.
2008/0143179 A1* 6/2008 Rutherford ............... B60T 7/20
303/20
(Continued)

FOREIGN PATENT DOCUMENTS

AU 2014204434 A1 * 2/2016
GB 2553466 8/2018

OTHER PUBLICATIONS

Patent Cooperation Treaty (PCT), International Search Report and Written Opinion for Application PCT/US2020/058530 filed Nov. 2, 2020, mailed Feb. 9, 2021 International Searching Authority, US.

*Primary Examiner* — George C Jin
(74) *Attorney, Agent, or Firm* — DAY PITNEY LLP; George N. Chaclas; Anthony A. Kassas

(57) ABSTRACT

This disclosure relates to remote control of a brake controller for a towed vehicle. An example communication system includes a controller management application operating on a mobile device and a brake controller that includes a wireless network controller to communicatively couple to the mobile device. The controller management application manages a plurality of profiles. Each profile includes characteristics of a corresponding towed vehicle. The controller management application receives a selection of one of the plurality of profiles, and determines braking characteristics based on the selected one of the plurality of profiles. The brake controller controls a braking signal to brakes of the towed vehicle according to the braking characteristics.

20 Claims, 7 Drawing Sheets

(51) Int. Cl.

| | |
|---|---|
| *B60T 8/17* | (2006.01) |
| *B60T 8/172* | (2006.01) |
| *B60T 8/88* | (2006.01) |
| *H04W 4/40* | (2018.01) |
| *H04W 4/80* | (2018.01) |

(52) U.S. Cl.
CPC .............. *B60T 8/885* (2013.01); *H04W 4/40*
(2018.02); *H04W 4/80* (2018.02); *B60T*
*2210/10* (2013.01)

(56) References Cited

U.S. PATENT DOCUMENTS

| | | | |
|---|---|---|---|
| 2008/0309156 A1* | 12/2008 | Kissel | B60T 7/20 |
| | | | 701/70 |
| 2010/0152989 A1 | 6/2010 | Smith et al. | |
| 2016/0257341 A1* | 9/2016 | Lavoie | B60W 30/18036 |
| 2018/0154874 A1* | 6/2018 | Kulkarni | H01M 8/1004 |
| 2019/0056736 A1 | 2/2019 | Wood et al. | |
| 2019/0111899 A1* | 4/2019 | Lange, III | H01R 13/665 |
| 2019/0126753 A1* | 5/2019 | Kulkarni | B60T 17/22 |
| 2019/0217831 A1 | 7/2019 | Viele | |
| 2020/0286311 A1* | 9/2020 | Sage | B60T 17/18 |
| 2022/0105912 A1* | 4/2022 | Fosdike | B60R 16/023 |

* cited by examiner

REMOTE CONTROL OF A BRAKE CONTROLLER FOR A TOWED VEHICLE

CROSS-REFERENCE TO RELATED APPLICATION

This application is a 35 U.S.C. 371 national stage filing of PCT Application No. PCT/US2020/058530, entitled "REMOTE CONTROL OF BRAKE CONTROLLER FOR A TOWED VEHICLE" filed on Nov. 2, 2020, which claims priority to U.S. Patent Application No. 62/929,472, entitled "REMOTE CONTROL OF BRAKE CONTROLLER FOR A TOWED VEHICLE" filed on Nov. 1, 2019, each of which are incorporated herein by reference in their entireties.

TECHNICAL FIELD

The present invention is generally related to vehicles with brake controllers to control trailer brakes and, more specifically, a wireless-enabled brake controller to assist in configuration and maintenance of the brake controller via a mobile device.

BACKGROUND

A variety of brake controllers may be employed to control the brakes of a towed vehicle. Typically, the brake controller may actuate the towed vehicle's brakes in response to braking by the towing vehicle. These brake controllers may often include accelerometers and microprocessors which may measure and/or take into account a variety of conditions (e.g., braking signal, acceleration, etc.), whereby the brake controller may apply the towed vehicle's brakes in such a manner that assists in stopping the towing vehicle and towed vehicle, and may also reduce the likelihood of an unsafe driving condition.

The brake controller is often mounted to the towing vehicle. Typically, the brake controller may be hard-wired to the towing vehicle, such as being mounted in the cab or passenger compartment of the towing vehicle. The brake controller may communicate with the brake system of the towed vehicle by means of a wiring system that may provide communication between the towing vehicle's brake system and the towed vehicle's brake system.

SUMMARY

An example communication system includes a controller management application operating on a mobile device and a brake controller that includes a wireless network controller to communicatively couple to the mobile device. The controller management application manages a plurality of profiles. Each profile includes characteristics of a corresponding towed vehicle. The controller management application receives a selection of one of the plurality of profiles, and determines braking characteristics based on the selected one of the plurality of profiles. The brake controller controls a braking signal to brakes of the towed vehicle according to the braking characteristics.

An example method includes managing, by controller management application operating on a mobile device a plurality of profiles. Each profile includes characteristics of a corresponding towed vehicle. The example method also includes receiving, by the controller management application, a selection of one of the plurality of profiles. Additionally, the method includes determining, by the controller management application, braking characteristics based on the selected one of the plurality of profiles. Further, the method includes controlling, by a brake controller including a wireless network controller to communicatively couple to the mobile device, a braking signal to brakes of the towed vehicle according to the braking characteristics.

A communication system may comprise a controller management application operating on a mobile device. The controller management application may be configured to manage a plurality of profiles, each profile including characteristics of a corresponding towed vehicle, receive a selection of one of the plurality of profiles and determine braking characteristics based on the selected one of the plurality of profiles. The communication system may also include a brake controller that controls a braking signal to brakes of the towed vehicle according to the braking characteristics, the brake controller including a wireless network controller to communicatively couple to the mobile device.

The foregoing communication system may include any one of or all of the following in any combination:

wherein the controller management application is configured to display, in real time, a representation of the braking signal received from the brake controller.

wherein the braking characteristics include at least one of a gain setting or a boost setting.

wherein the controller management application is configured to determine braking characteristics based on the selected one of the plurality of profiles and road conditions.

the controller management application determines the road conditions based on sensor measurements received from the brake controller.

wherein the controller management application determines the road conditions based on information received from a remote server.

wherein the plurality of profiles are stored on the mobile device.

wherein the plurality of profiles are stored on a remote cloud server accessible by the controller management application.

wherein the plurality of profiles are stored on the brake controller.

wherein the controller management application is configured to display an alert in real time in response to receiving an indication of a fault condition from the brake controller.

wherein the brake controller is communicatively coupled to the mobile device via Bluetooth.

A method according to the present teachings may comprise managing, by controller management application operating on a mobile device a plurality of profiles, each profile including characteristics of a corresponding towed vehicle, receiving, by the controller management application, a selection of one of the plurality of profiles, determining, by the controller management application, braking characteristics based on the selected one of the plurality of profiles, and controlling, by a brake controller including a wireless network controller to communicatively couple to the mobile device, a braking signal to brakes of the towed vehicle according to the braking characteristics.

The foregoing method may include any of the foregoing or all of the foregoing in any combination:

displaying, in real time by the controller management application, a representation of the braking signal received from the brake controller.

wherein the braking characteristics include at least one of a gain setting or a boost setting.

wherein determining the braking characteristics is further based on road conditions.

determining, by the controller management application, the road conditions based on sensor measurements received from the brake controller.

determining, by the controller management application, the road conditions based on information received from a remote server.

retrieving, by the controller management application, the plurality of profiles from memory of the mobile device.

retrieving, by the controller management application, the plurality of profiles from a remote cloud server accessible by the controller management application.

retrieving, by the controller management application, the plurality of profiles from the brake controller.

displaying, by the controller management application, an alert in real time in response to receiving an indication of a fault condition from the brake controller.

BRIEF DESCRIPTION OF THE DRAWINGS

Operation of the present disclosure may be better understood by reference to the following detailed description taken in connection with the following illustrations, wherein.

DETAILED DESCRIPTION

Figure 1:
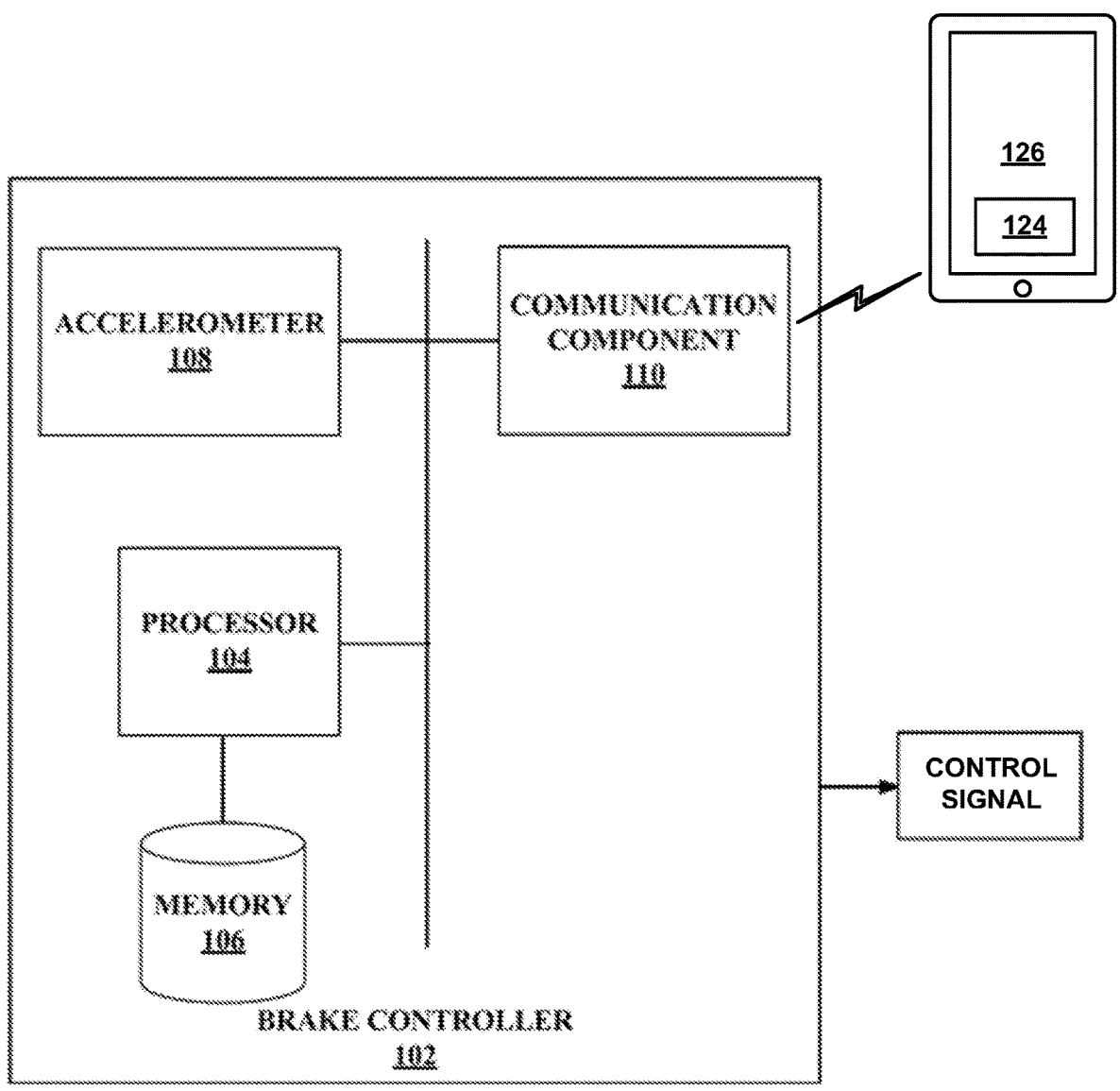
FIG. 1 is a block diagram of a brake controller system operating in accordance with the present disclosure.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a"

and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). As such, embodiments may describe a user action that may not require human action.

"User equipment," "device," "user equipment device," "mobile device," "client," and the like are utilized interchangeably, unless context warrants particular distinction(s) among the terms. For example, user equipment may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), global positioning system (GPS) devices, and the like.

As used herein, a towing vehicle may include various types of automobiles (e.g., car, truck, recreational vehicle ("RV"), etc.). A towed vehicle may include trailers (e.g., agricultural trailers, boat trailers, cargo trailers, etc.), a car, a fifth-wheel RV or camper, or the like. It is noted that various combinations of towed vehicles and towing vehicles may utilize some or all aspects of this disclosure.

Towing vehicles may include a brake controller that actuates a towed vehicle's brakes in response to braking by the towing vehicle. Brake controllers may be programmed by a user to take into account characteristics of the towed vehicle that may affect braking effectiveness, such as vehicle weight, road conditions, number of axles, etc. Additionally, brake controllers may also have a gain and a boost settings. The gain setting adjusts the amount of braking force that the electric brakes provide. The boost setting increases an initial trailer braking (e.g., for heavier trailers, etc.). The gain and boost may be manually set by a user interacting with the brake controller. These manual processes of setting the gain and boost may be inefficient and time consuming when having to repeat them every time a different towed vehicle is attached. Further, some users may incorrectly set gain and boost settings. Likewise, users may not adjust gain and boost settings when appropriate.

A system is described below for communicating with and adjusting a brake controller, and storing towed vehicle data to be quickly accessible to a user when changing towed vehicle and/or towed vehicle attachments. The brake controller is wirelessly enabled to communicate with a mobile device of a user. An application executing on the mobile device facilitates pairing the mobile device with the brake controller. The application receives inputs from the user to specify characteristics of towed vehicles. In some examples, the application stores multiple profiles of towed vehicles that each store characteristics of a towed vehicle. In some examples, the brake controller stores the profiles associated with an identifier. When a particular towed vehicle is attached to the towing vehicle, the user may select the corresponding stored profiles for that towed vehicle. In some examples, the characteristics are sent to the brake controller to configure the brake controller according to the specific characteristics to the towed vehicle. Alternatively, in some examples, based on an identifier received from the application, the brake controller may retrieve the corresponding profile and configure itself according to the specific characteristics to the towed vehicle. In such a manner, the user may use multiple towed vehicle without manually configuring the brake controller for each vehicle each time. In some examples, the brake controller may communicate diagnostic data and/or warnings to the user device to assist troubleshooting and maintenance.

FIG. 1 is a block diagram of a brake controller system 100 operating in accordance with the present disclosure. The brake controller system 100 includes a brake controller 102 and a controller management application 124 operating on a mobile device 126. The brake controller 102 may be a proportional or inertia based system for a towing and towed vehicle system. In the illustrated example, a brake controller 102 includes a processor 104, a memory 106, an accelerometer 108, and a communication component 110. Exemplary, non-limiting brake controller units are disclosed in U.S. Pat. Nos. 6,012,780; 6,068,352; 6,282,480; 6,445,993; 6,615,125; 8,746,812; 8,789,896; and 9,150,201, which are incorporated herein by reference.

The processor 104 uses a gain setting and a boost setting to control the brakes of the towed vehicle. The gain setting adjusts (e.g., increases, decreases, etc.) the power applied to the towed vehicle's brakes during a braking event by the brake controller 102. The boost setting sets an initial output from a brake controller to the towed vehicle brakes. The brake controller 102 may include a number of boost settings of levels that specify a starting power setting (e.g., above zero) that starts as the baseline power to the brake. For example, with no boost, the baseline power may be zero percent and at a first level of boost, the baseline power may be thirteen percent. To stop the towed vehicle, the processor 104 applies power to the brake that increases from this baseline as the towed vehicle decelerates. The processor 104 may use a transfer function for gain or boost adjustments. The transfer function may be, for example, determined by a ratio of deceleration (e.g., which may be sensed or determined by an accelerometer) and characteristics of the output signal sent to towed vehicle brakes (e.g., change in power applied to brakes, change in current/voltage applied to brakes, etc.). The transfer function may then be utilized to determine values of the signal sent to the towed vehicle brakes. The processor 104 determines the transfer function based on, in part, input from a user (e.g., via controller management application 124) regarding the characteristics of the towed vehicle, including size and weight. The transfer function may also be based on operating parameters of the towing vehicle, such as towed/towing vehicle speed (e.g., from the accelerometer, e.g., from the towing vehicle data (CAN) bus, etc.), the towed vehicle brake condition, road conditions (e.g., gravel, paved, weight, dry, etc.), and/or weather conditions (e.g., precipitation, temperature, wind, etc.). The transfer function adjusts the boost and the gain to determine values of the signal sent to the towed vehicle brakes by the processor 104.

Different towed vehicles need different transfer functions because of the difference characteristics of each function.

The processor 104 may receive these characteristics in response to a selection of trailer profile by the user on the controller management application 124 via the communication component 110. Alternatively or additionally, in some examples, the processor 104 may receive these characteristics during a brake controller setup, store them in the memory 106, and retrieve them from the memory 14 in response to receiving an identifier associated with a trailer profile from the controller management application 124 via the communication component 110. In some examples, the memory 106 may store multiple profiles, each associated with a different transfer function.

In some examples, the processor 104 may utilize historical operating parameters or conditions. In some such examples, the processor 104 may store, in memory 106, the operating conditions when a user stops the towing vehicle's motion or turns the car off and associate that data with the profile of the currently selected towed vehicle. The processor 104 may recall this information when the user starts the towing vehicle up again or selects the profile of that towed vehicle again. Thus, improvement and/or refinements made to the transfer function over time as the processor 104 obtains data on the operation conditions may be saved for the next time the particular towed vehicle is selected.

In some examples, to assist diagnostics, processor 104 logs, in memory 106, data of the operation conditions and operational status related to operation of the towing and towed vehicle. For example, the processor may log the amplitude of the signal output to the brakes of the towed vehicle, the measurements from the accelerometer 108, braking signals received from a brake controller of the towing vehicle, the gain, boost settings over time, and/or which profile is selected and the corresponding towed vehicle characteristics, and/or malfunctions/failures as described below, etc.

In some examples, the processor 104 may detect, via a diagnostic routine, data relating to any system malfunction or failure. The diagnostic routine may use failure codes to categorize the malfunction to send to the controller management application 124 via the communication component 110. The processor 104 may detect, for example, excessive current on a brake wire electrically coupling the brake controller 102 to the brakes of the towed vehicle, a short on the brake wire, a lost connection to the battery ground, and/or a lost connection to the towed vehicle brakes, etc.

The processor 104 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 106 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 106 includes multiple kinds of memory, particularly volatile memory and non-volatile memory.

The memory 106 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 106, the computer readable medium, and/or within the processor 104 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The accelerometer 108 is an inertia sensor, such as a single or multi-axis accelerometer (e.g., two-axis, three-axis, etc.), gyroscope, or the like. The brake controller 102 may be mounted in a cab of a towing vehicle as an after market product or as part of the original equipment manufacture (i.e., installed in the factory on the new vehicle). When the towing vehicle changes its speed and/or travels on a different road grade, the accelerometer 108 generates an output indicative to this change. These measurements by the accelerometer 108 are provided to other components of the brake controller 102, such as the processor 104, to control the brakes of the towed vehicle. The accelerometer 108 may include circuitry and/or mechanical components that are responsive to changes in forces, such as changes in acceleration. In some examples, the accelerometer 108 may comprise multiple accelerometers to measure one or more forces.

The communication component 110 includes one or more communication devices communicatively coupled to the mobile device 126. The communication component 110 includes hardware, software, and/or a combination of hardware and software to facilitate wireless communication.

The communication component 110 includes one or more controller to communicate with the mobile device 126 over a network. For examples, the communication component 110 may include a controller with receives and transmitters for a radio access network (RAN), such as WiMAX networks (IEEE 802.16m), local area wireless networks (including IEEE 802.11 a/b/g/n/ac/p or others), Wireless Gigabit networks (IEEE 802.11ad), etc.) and/or personal area networks (e.g., Near Field Communication (NFC), BLUETOOTH® or BLUETOOTH® LOW ENERGY (BLE), ZIGBEE®, etc.). The communication component 110 may facilitate wireless communication, in whole or in part, over more local area networks (including such networks provided by the vehicle and/or towed vehicle/towed product) or cellular data networks, so as to incorporate aspects of cloud-based computing systems, information available via world wide web and/or other internet connectivity, etc.

The controller management application 124 executing on the mobile device 126 receives a towed vehicle selection and/or characteristics of the towed vehicle from the user and sends that input to the brake controller 102. The brake controller 102 uses this input to determine the signal to control the brakes of the towed vehicle. The mobile device pairs with the communication component 110 of the brake controller 102 (such as via BLUETOOTH®) and receives an identifier (e.g., a serial number, a BLUETOOTH® identifier, etc.) that identifies the brake controller 102. In some examples, the controller management application 124 stores multiple profiles of towed vehicles (e.g., to facilitate a user that may use a towed vehicle across multiple towing vehicles with brake controllers 102, etc.). In some such examples, the controller management application 124 stores the profiles on a remote server (e.g., a cloud server, etc.) to facilitate retrieval of the profiles by controller management application executing on multiple devices associated with the same user. In some examples, the brake controller 102 stores the multiple profiles that are, upon connection, retrieved by the controller management application 124 (e.g., to facilitate a towing vehicle that may be used by multiple users with different mobile devices 126, etc.). In either case, the controller management application 124 manages (e.g., creates, modifies, deletes, etc.) the profiles in response to input from the user. The controller management application 124 may, for example, receive characteristics associated with a towed vehicle, including (i) a type of the towed vehicle (e.g., RV, utility trailer, cargo trailer, livestock trailer, etc.), (ii) a type of hitching system (e.g., gooseneck hitch, fifth wheel hitch, bumper pull hitch, etc.), (iii) a weight of the towed vehicle, (iv) a weight of a tongue of the towed vehicle, (v) a length of the towed vehicle, (vi) a number of axles of the towed vehicle, and/or the (vii) the brake type of the towed vehicle (e.g., electric, hydraulic, etc.), etc. The user may also input a user-generated identifier for the towed vehicle to assist subsequently identifying the profile.

In some examples, these characteristics are then processed by the controller management application 124 to calculate a boost setting and a gain setting for brake operations and communicated to the brake controller 102 to implement the calculated settings. This information may also be provided to other towing accessories that communicatively couple to the mobile device 126. The controller management application 124 may display the boost setting and the gain setting and receive input for a user to adjust each setting.

The mobile device 126 may be any portable device capable of executing applications and directly or indirectly establishing communication with communication component 110. The mobile device 126 may have a processor, a memory, a transceiver, an input device, and an output device. Examples of such devices include cellular telephones (e.g., smart phones), personal digital assistants (PDAs), portable computers, tablet computers (tablets), hand held gaming counsels, wearables (e.g., smart watches), etc.

Figure 2:
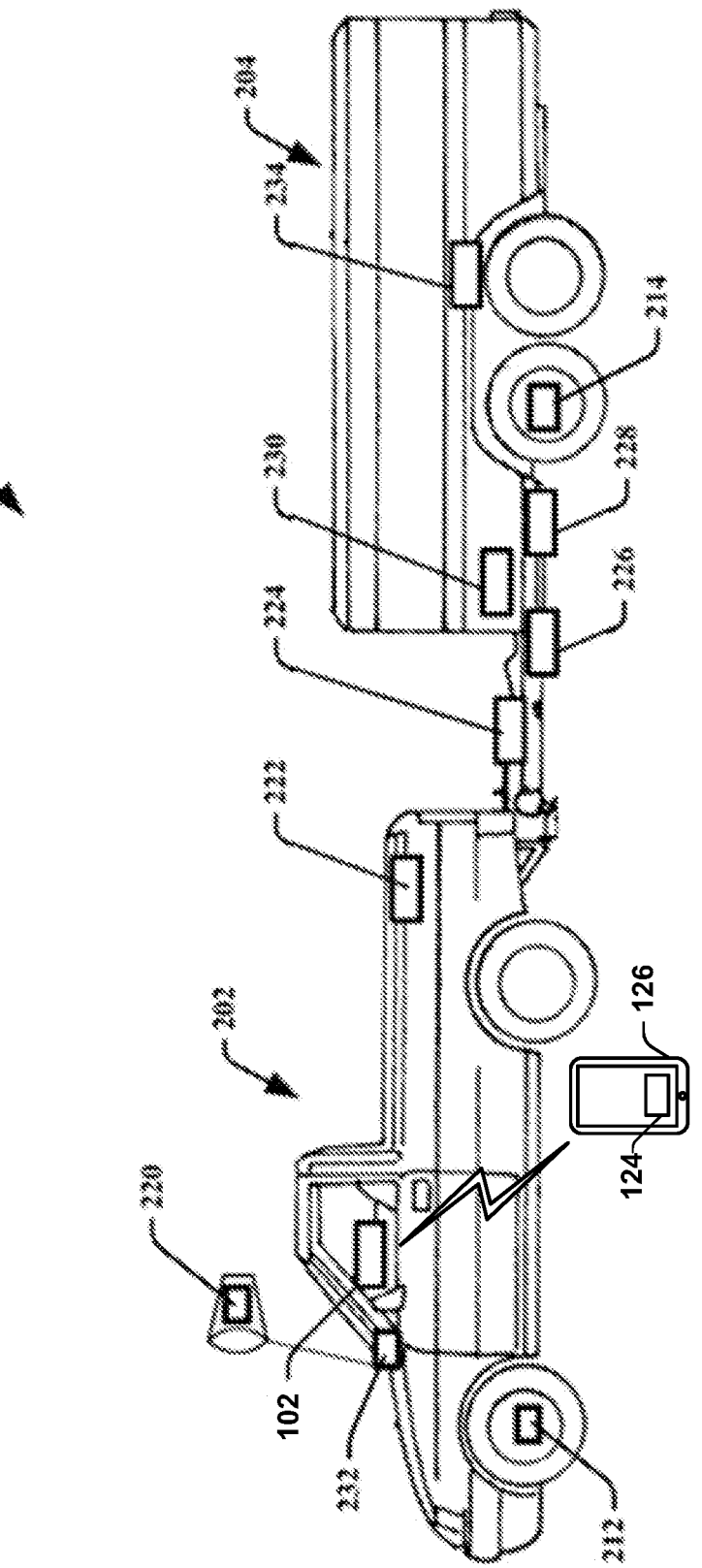
FIG. 2 is a block diagram of the brake controller system of FIG. 1 with a towing and towed vehicle operating in accordance with the present disclosure.

FIG. 2 illustrates an example diagram of a brake controller system 200 for a towing vehicle 202 and a towed vehicle 204. In the illustrated example, a brake controller 210 is mounted in the towing vehicle 202. The brake controller 210 is operatively connected to brakes (not shown) of the towed vehicle 204 to apply a signal to the brakes of the towed vehicle 204 to achieve a stopping force to stop the towed vehicle 204. The brake controller system 200 includes the brake controller 102 of FIG. 1.

In the illustrated example, the brake controller system 200 includes one or more speed sensors 212 and 214. The speed sensors 212 and 214 measure the speed of the towing vehicle 202 and/or the towed vehicle 204. The speed sensor 212 may comprise an accelerometer, gyroscope, or other electronic device (e.g., the accelerometer 108 of FIG. 1, etc.). The speed sensor 212 may be mounted on a wheel, axle, a lug nut, or other portion of the towing vehicle 202 or the towed vehicle 204. For example, an accelerometer may be mounted on a tire stem that is concentric with a wheel, etc. In such an example, as the wheel rotates, the accelerometer determines wheel speed. For example, the accelerometer's first axis may be used to sense the rotation of the wheel because it is the axis that is closest to being tangential to the circumference of the tire or perpendicular to it. The accelerometer output changes in a sinusoidal fashion as the wheel rotates. Thus, the rotation of the wheel angle (θ) as a function of time (t) can be measured (e.g., dθ/dt, etc.). This dθ/dt is measured as a function of the brake output (e.g., voltage, power, current, etc.) sent to or calculated for the trailer brakes. The lower the dθ/dt for a given brake voltage, for example, the lower the effective coefficient of friction (μ) of the road surface. The brake controller 102 selects a gain value that is based on, for example, (a) the gain setting received from the controller management application 124, (b) the coefficient of friction (μ), and (c) the weight of the trailer received from the controller management application 124. This gain value translates to a transfer function that includes a lower boost level when the brakes are more effective and/or the trailer is lighter, or a higher boost level when the brakes are less effective and/or the trailer is heavier.

The brake controller 102 stores one or more of speed, acceleration, gain, transfer function, and boost settings in a memory (e.g., memory 106 of FIG. 1) associated with one of the towed vehicle profiles. The brake controller 102 may use this historical data to determine updated gain, transfer function, and boost settings for the towed vehicle associated with the profile of one of the multiple profiles each associated with a different towed vehicle. For example, if speed falls below a threshold value for a given braking power, the wheels may be in a locked state. In such a scenario, when the current gain setting for the given braking power was not previously cause the wheels being in a locked state, the brake controller 102 may trigger a recalculation of the transfer function (e.g., because the operating conditions of the towing vehicle have changed, etc.). This operation data may be provided to the controller management application 124 in the form of raw data, alerts, and/or diagnostic codes.

While FIG. 2 illustrates speed sensors 212 and 214, braking control system 200 may receive measurements from other sensors via, for example, one or more data buses communicatively connecting electronic control units (ECUs), including the brake controller 102, such as with a controller area network (CAN) bus as defined by International Standards Organization (ISO) 11898-1, a Media Oriented Systems Transport (MOST) bus, or a CAN flexible data (CAN-FD) bus (ISO 11898-7), etc. For example, the sensors may include an environmental sensor 220 that may measure wind speeds, directions, and/or humidity, etc. The sensors may include a telematics unit of the towing vehicle 202 that maintains a connection to an external network, such as the Internet, to provide weather, traffic, and/or road condition data, etc. to various ECUs, including the brake controller 102. The sensors may include one or more tire pressure monitoring system (TPMS) sensors to provide, for example, tire pressure of one or more tires of the towing vehicle 202 that may inform the brake controller 102 of the operating conditions of the towed vehicle 204. In some examples, the brake controller 102 receives status and/or operational data from one or more modules or ECUs of the towing vehicle 204 and/or of the towed vehicle 204. This status and/or operational data may be used to determine the transfer function and/or may be forwarded in whole or in part to the controller management application 124. For example, the modules or ECUs may include a fifth wheel hitch or gooseneck coupler and ball module 222, a coupler module 224, a jack assembly module 230, a sway controller module 226, a weight distribution module 228 and/or a windshield wiper module 232.

In some examples, the fifth wheel hitch or gooseneck coupler and ball module 222 may sense and collect various data parameters related to the function of a fifth wheel hitch or gooseneck coupler and ball and/or the conditions under which such operates. For example, the module 222 may perform warranty or diagnostic type data collection as it relates to cycles, load, trip data, vibration profile, misuses occurred such as loading with jaws closed or highball attachment, age, and additional sensor information. In some examples, the fifth wheel hitch and gooseneck coupler and ball module 222 communicates data related to the function of a fifth wheel hitch or gooseneck coupler and ball and/or the conditions under which such operates to the brake controller 102 to be used to determine the operational conditions of the towed vehicle, to store in the memory 106, and/or to send to the controller management application 124. For example, the module 222 may communicate data to identify goose pop up, connection of jaws, and second lock latch status. In some examples, the module 222 communicates diagnostic status such as hitch pin, load, disconnect status, usage, wear, safety chain engagement, if actuation is open or closed, proximity to cab/trailer and/or connection or disconnection, etc. that, in turn, may be communicated by the brake controller 102 to the controller management application 124.

Similarly, in some examples, the coupler module 224 senses and collects various data parameters related to the function of a coupler and/or the conditions under which the coupler operates. For example, the module 224 may perform warranty or diagnostic type data collection as it relates to a coupler safety pin, whether the coupler is connected or disconnected, load, usage, vibration profile, and misuse or wear. The coupler module 224 communicates various data parameters related to the function of a coupler to the brake controller 102 to be, for example, sent to the controller management application 124. For example, the coupler module 224 may communicate data to identify connection status or the status of a second lock or catch. Further, the coupler module 224 may communicate diagnostic status such as load and disconnect status. Additional sensed parameters may include usage, wear, proximity to cab/trailer, connection or disconnection, and safety pin.

In some examples, the jack assembly module 230 senses and collects various data parameters related to the function of a jack assembly. For example, the jack assembly module 230 may perform warranty or diagnostic type data collection as it relates to load, cycles, position of the jack (extended or retracted), travel, pivot, and lubrication. The jack assembly module 230 communicates various data parameters related to the function of a jack assembly. For example, the jack assembly module 230 may communicate data to identify position, load, effort, failure, wear/cycle, lubrication, electrical drive position or level, warnings for load or overload conditions, assist in hookup, and proximity related to jack stow or work positions. These characteristics may be sent to the controller management application 124.

In some examples, the sway controller module 226 may sense a wheel speed, number of occurrence of sway control, the magnitude of occurrence of sway control, trailer conditions, gain, load, pin weight, etc. In some examples, the weight distribution module 228 senses cycles, load, usage, pads, profile, number of bar disconnects, clips, and trip data such as turns, bar disconnect status, and/or friction pad wear, etc. In some examples, the windshield wiper module 232 may communicate sense when windshield wipers are operating. If the wipers are operating over a set length of time (e.g., 10 seconds), the brake controller 102 may identify the possibility of wet weather.

Figure 3A:
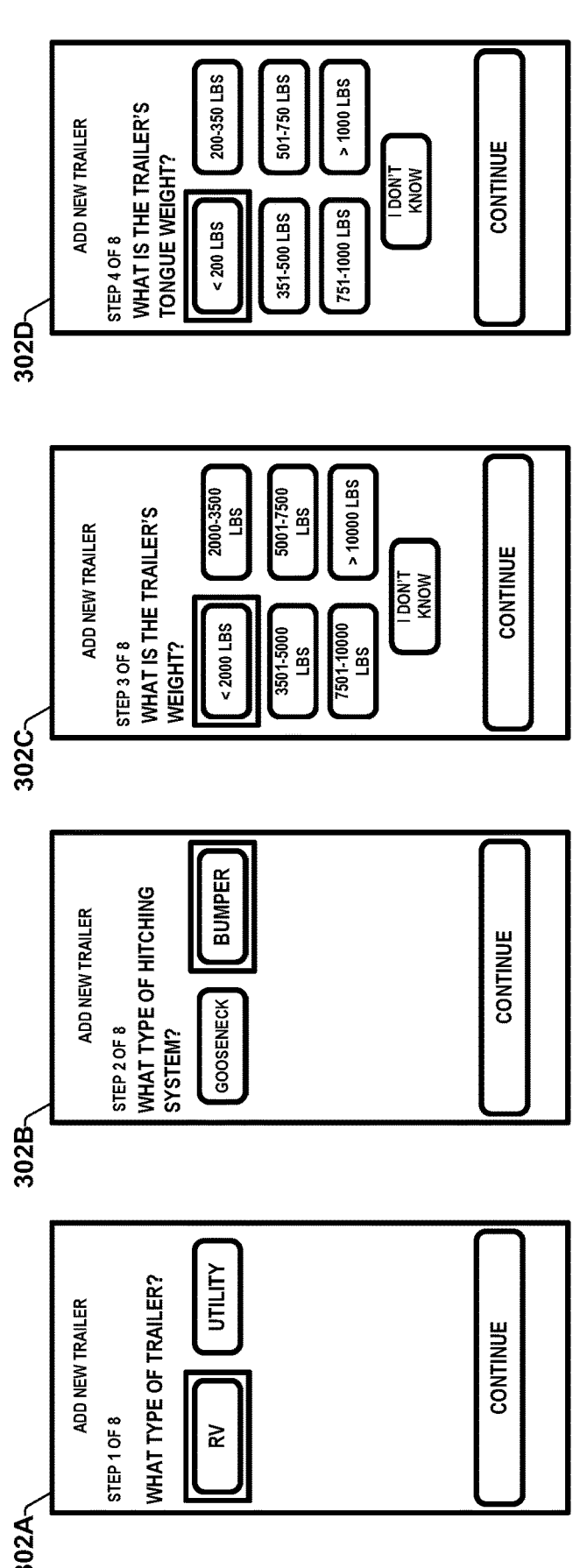
FIGS. 3A and 3B illustrate example interfaces to configure profiles for multiple trailers in accordance with the present disclosure.
Figure 3B:
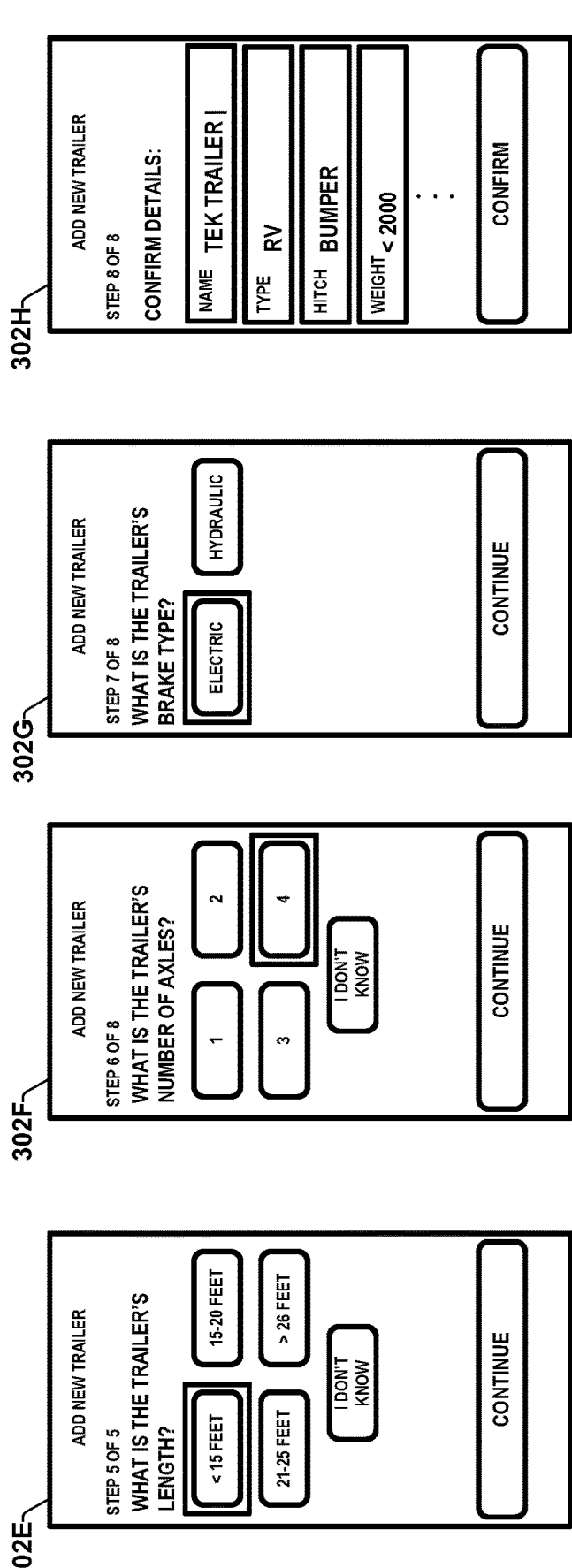

FIGS. 3A and 3B illustrate example interfaces 302A-302H of the controller management application 124 of FIGS. 1 and 2. The controller management application 124 manages (e.g., creates, modifies, deletes, etc.) multiple profiles for towed vehicles. The controller management application 124 may manage multiple profiles, each profile being created for a different towed vehicle. The controller management application 124, via the mobile device 126, pairs with a wirelessly enabled brake controller (e.g., the brake controller 102 of FIGS. 1 and 2) to manage towed vehicle profiles. Once paired, the user may select an existing towed vehicle profile within the controller management application 124 to edit or delete, or enter characteristics to add a new profile for a towed vehicle to the controller management application 124. When entering characteristics for a new towed vehicle, the user is prompted to enter (a) the type of towed vehicle (e.g., if the towed vehicle is an RV or a utility/cargo livestock towed vehicle, etc.), (b) the type of hitching system (e.g., if it is a gooseneck or a bumper pull system, etc.), (c) the weight of the towed vehicle (d) the tongue weight of the towed vehicle, (e) the length of the towed vehicle, (f) the number of axles on the towed vehicle, and/or (g) the types of brakes on the towed vehicle (e.g., electric or hydraulic brakes, etc.). Interface 302A is an example interface presented to the user to enter the type of towed vehicle. Interface 302B is an example interface presented to the user to enter the type of hitching system. Interface 302C is an example interface presented to the user to enter the weight of the towed vehicle. Interface 302D is an example interface presented to the user to enter the tongue weight of the towed vehicle. Interface 302E is an example interface presented to the user to enter the length of the towed vehicle. Interface 302F is an example interface presented to the user to enter the number of axles on the towed vehicle. Interface 302G is an example interface presented to the user to enter the types of brakes on the towed vehicle. The user is also prompted to enter an identifier to associate with the profile of the towed vehicle to facilitate future selection and management of the profile. Interface 303H is an example interface presented to the user to enter the identifier. In some examples, the controller management application 124 calculates an initial boost setting and an initial gain setting for optimal brake operations. Upon selection of the profiles, the initial boost setting and an initial gain setting may be communicated to the brake controller 102 to implement the calculated settings. Additionally, in some examples, the controller management application 124 may communicate one or more characteristics to the brake controller 102.

Figure 4:
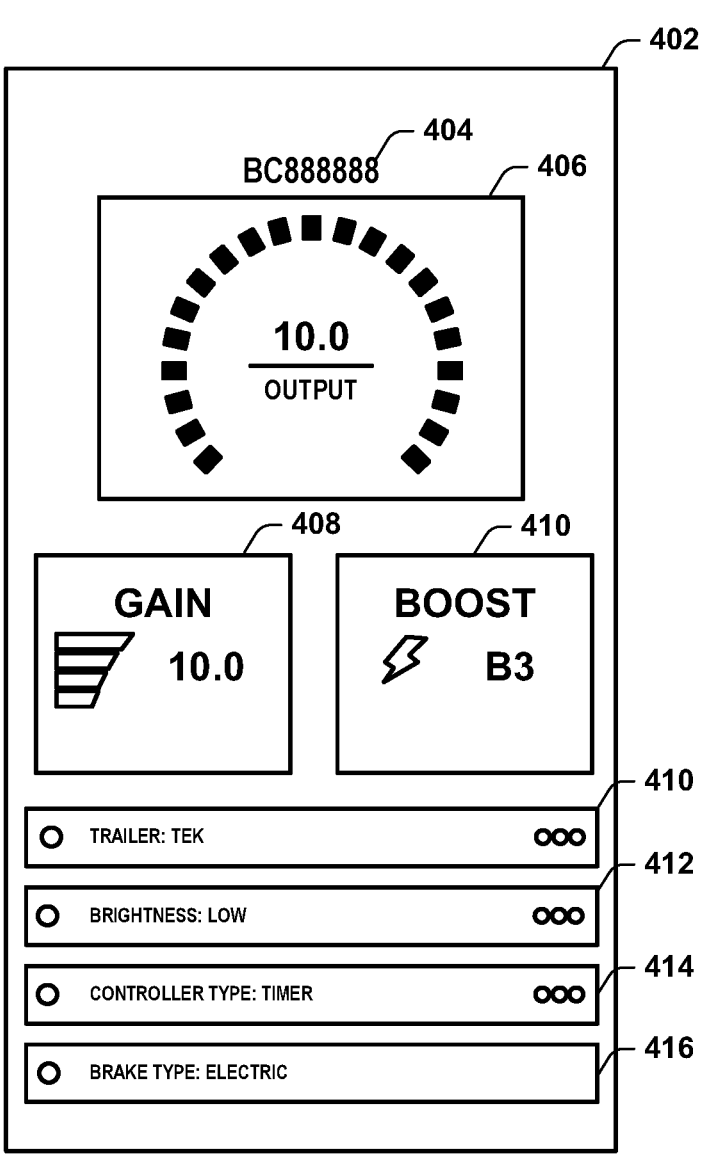
FIG. 4 illustrates an example interface to view, select and/or edit the profiles for trailers in accordance with the present disclosure.

FIG. 4 illustrates an example profile interface 402 that displays a selected profile to the user. The profile interface 402 displays an identifier 404 associated with the currently paired brake controller 102. Additionally, the profile interface 402 displays real-time (or near real time (to account for processing and transmission delays)) settings and/or outputs of the brake controller 102. In the illustrated example, the profile interface 402 displays an output voltage 404 of the brake controller 102. The profile interface 402 also displays the gain setting 406 and the boost setting 408. Upon interacting with the gain setting 406 and the boost setting 408, the user may be prompted to adjust the gain setting and the boost setting of the brake controller 102. Upon such a change, the new setting is communicated to the brake controller. In the illustrated example, the profile interface 402 displays the connection status of the brake controller 410, display brightness 412 for an in-cabin display displaying data associated with the brake controller 102, a type of control 414 being used by the brake controller 102, and the type of brakes being used on the trailer 416. When the user changes from one towed vehicle profile to another (e.g., by interacting the connection status of the brake controller 410), the stored gain and boost setting in the selected profile are shown on the profile interface 402 and the store boost setting and gain setting is sent to brake controller 102 to update the settings.

Figure 5:
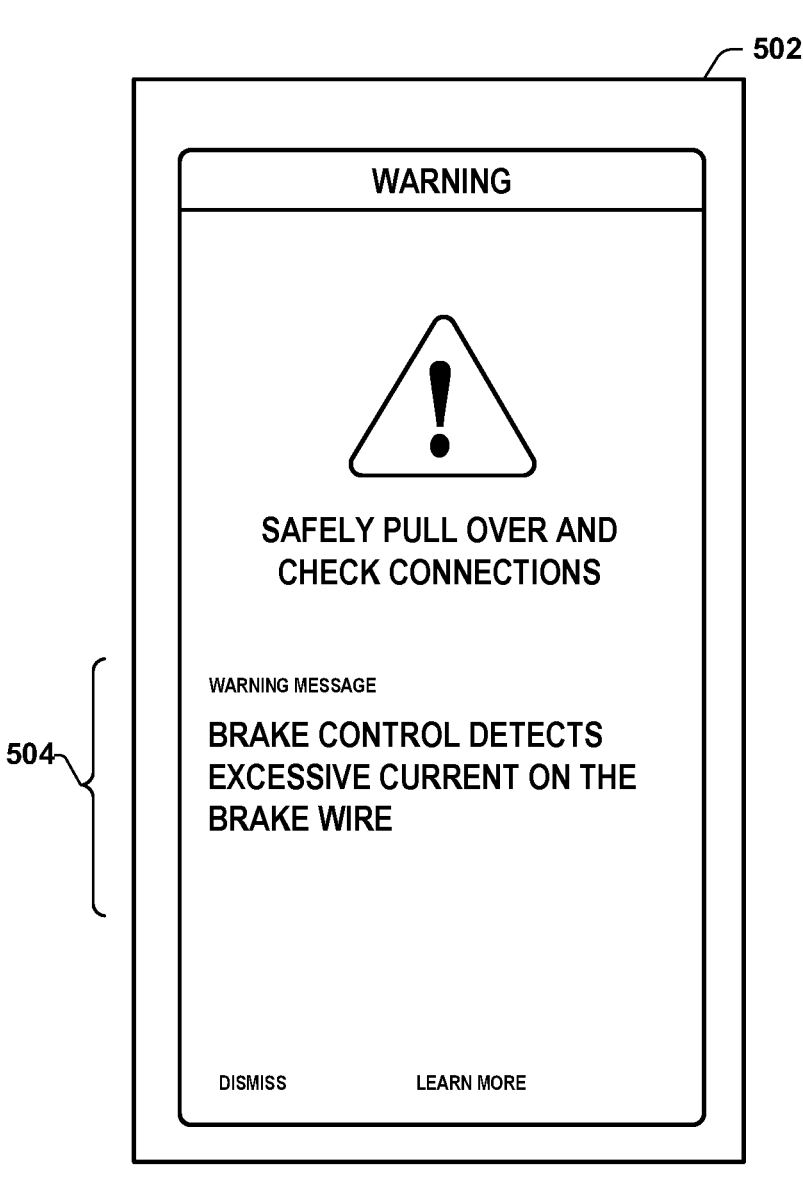
FIG. 5 illustrates an example interface to provide operational data of the brake controller in accordance with the present disclosure.

FIG. 5 illustrates an example alert interface 502 to inform the user of an issue to be addressed. In the illustrated example, the alert interface 502 provides a warning message 504 that specifies a type of error. In some examples, the warning message 504 includes a diagnostic code and/or sensor reading that prompted the error. Additionally, in some examples, when there is an error occurred in the brake controller 102, alert interface 502 may block all view of the rest of the application to making it clear that the system is not working properly. In such examples, the user may be required to make an affirmative to return the profile interface 402. Alerts may be stored in an alert log for further review or analysis. In some examples, if the alert issue is resolved, then management control application 124 switched back to the previous profile interface 402 automatically.

Figure 6:
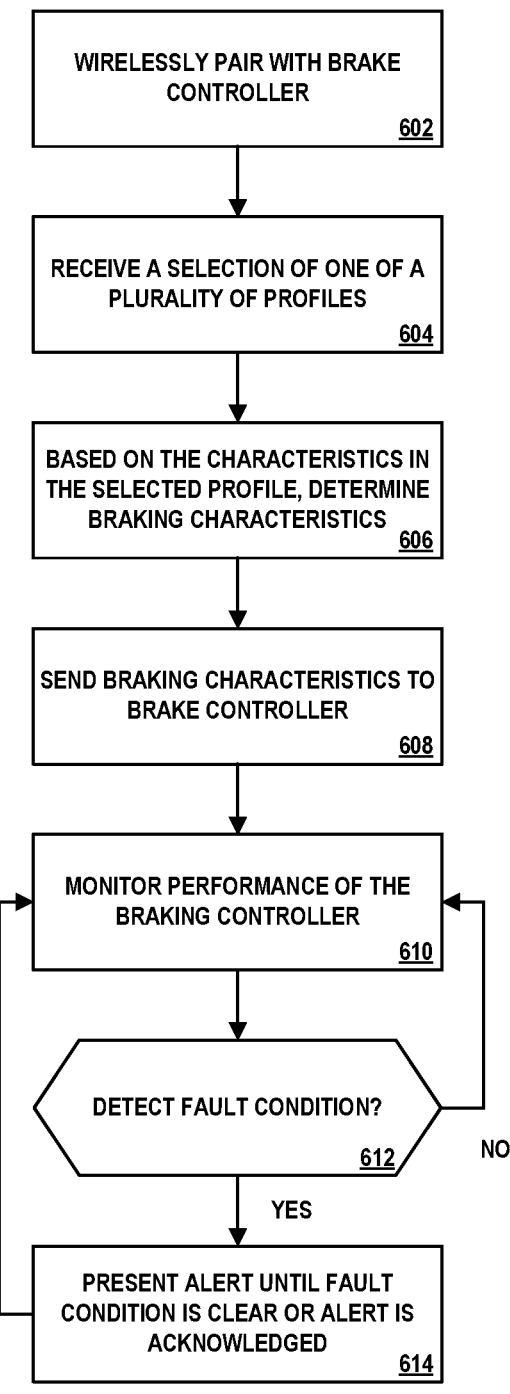
FIG. 6 illustrates an example method to control the brake controller with a controller management application operating on the mobile device in accordance with the present disclosure.

FIG. 6 illustrates an example method to control brake controller 102 with the controller management application 124 operating on the mobile device 126. Initially, the controller management application 124 pairs with the brake controller 102 over a wireless network, such as BLE (602). The controller management application 124 receives a selection of one of a plurality of profiles each associated with a towed vehicle with a different combination of characteristics (604). Based on the characteristics (e.g., weight, length, number of axles, etc.), the controller management application 124 determines braking characteristics (e.g., a transfer function, a gain setting, a boost setting, etc.) for the selected towed vehicle (606). In some examples, the controller management application 124 may use additional factors when determine the braking characteristics that available to systems external to the towing/towed vehicle, such as to servers operating in a network. In such examples, the controller management application 124 may connected to these servers to receives information regarding the operating conditions of the vehicle, such as road conditions (e.g., gravel, paved, weight, dry, etc.), and/or weather conditions (e.g., precipitation, temperature, wind, etc.), etc. based on, for example, the location of the mobile device 126 (as determined by a GPS receiver, etc.). In some examples, the controller management application 124 may use past performance (as logged by the controller management application 124 and/or the brake controller 102) of the towed vehicle (e.g., when the profile associated with the towed vehicle was selected, etc.) to determine the braking characteristics. The controller management application 124 sends the braking characteristics to the brake controller 102 (608). The controller management application 124 monitors the performance of the brake controller 102 (610). For example, the brake controller 102 may send sensor measurements and/or diagnostic codes to the controller management application 124. Based on the information received from the brake controller 102, the controller management application 124 determines whether a fault condition has been detected (612). When a fault condition has been detected (YES at 612), the controller management application 124 presents an alert until the fault condition is clear or the alert is acknowledged by a user (614). Otherwise, when a fault condition has not been detected (NO at 612), the controller management application 124 continues to monitor the performance of the brake controller 102 (610).

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof

Having thus described the invention, the following is claimed:

1. A communication system comprising:
    a controller management application configured to:
        manage a plurality of profiles, each profile comprising characteristics of a corresponding towed vehicle;
        receive a selection of one of the plurality of profiles; and
        determine braking characteristics based on the selected one of the plurality of profiles to create a transfer function; and
    a brake controller that controls a braking signal to brakes of the towed vehicle according to the transfer function;
    wherein the controller management application is configured to display, in real time, a representation of the braking signal received from the brake controller, a boost setting, and a gain setting,
    wherein the transfer function is automatically refined over time based on operating data obtained by the brake controller and saved in association with the selected one of the plurality of profiles for use in subsequent operations.

2. The communication system of claim 1, wherein the controller management application is configured to receive inputs from a user to automatically adjust in real time the boost setting and the gain setting, and wherein the transfer function is refined over time and updated as the brake controller obtains data of operating conditions.

3. The communication system according to claim 1, wherein the controller management application is configured to determine the braking characteristics based on the selected one of the plurality of profiles and road conditions.

4. The communication system of claim 3, wherein the controller management application determines road conditions based on sensor measurements received from the brake controller and on information received from a remote server.

5. The communication system according to claim 1, wherein the plurality of profiles is stored on a remote cloud server accessible by the controller management application or on the brake controller.

6. The communication system according to claim 1, wherein the controller management application is configured to display an alert in real time in response to receiving an indication of a fault condition from the brake controller.

7. The communication system of claim 1, wherein the transfer function is refined over time and updated by logging the operating data comprising: amplitude of the braking signal, measurements from an accelerometer on the towed vehicle, measurements from a speed sensor on the towed vehicle, the boost setting, and the gain setting.

8. The communication system of claim 1, wherein the selected one of the plurality of profiles has a unique identifier and selection of the towed vehicle via the unique identifier enables the controller management application to apply historic and real-time operation data to generate the transfer function.

9. The communication system of claim 1, wherein the gain setting is based on a coefficient of friction and a weight of the towed vehicle.

10. The communication system of claim 1, wherein the towed vehicle comprises a sway controller module assembly for sensing load and weight distribution so that the transfer function accounts for load and weight distribution of the towed vehicle.

11. A method comprising:
    managing, via a controller management application operating on a mobile device, a plurality of profiles, each profile comprising characteristics of a corresponding towed vehicle;
    receiving, via the controller management application, a selection of one of the plurality of profiles;
    determining, via the controller management application, braking characteristics based on the selected one of the plurality of profiles to create a transfer function;
    directing, via a brake controller comprising a wireless network controller communicatively coupled with the mobile device, a braking signal to brakes of the towed vehicle determined based on the transfer function;
    sending, via the brake controller, the braking signal to the controller management application; and
    displaying in real time, via the controller management application, a representation of the braking signal and a boost setting,
    wherein the transfer function is automatically refined over time based on operating data obtained by the brake controller and saved in association with the selected one of the plurality of profiles for use in subsequent operations.

12. The method of claim 11, wherein the braking characteristics include a gain setting.

13. The method of claim 11, wherein determining the braking characteristics is further based on road conditions.

14. The method of claim 13, comprising determining, by the controller management application, the road conditions based on sensor measurements received from the brake controller.

15. The method of claim 13, comprising determining, by the controller management application, road conditions based on information received from a remote server.

16. The method of claim 11, comprising retrieving, by the controller management application, the plurality of profiles from memory of the mobile device and/or the plurality of profiles from a remote cloud server accessible by the controller management application.

17. The method of claim 11, wherein subsequent operations comprises:
    operation of the brake controller when the towing vehicle is next operated with the corresponding towed-vehicle profile;
    operation of the brake controller when the controller management application selects the profile of the corresponding towed vehicle after that towed vehicle is attached; and
    operation of the brake controller when the controller management application and/or the brake controller uses the stored operating data associated with the selected profile to determine updated gain, boost, and/or transfer function settings for controlling the braking signal for a corresponding towed vehicle.

18. The method of claim 11, wherein the transfer function is refined over time and updated as the brake controller obtains data of operating conditions.

19. The method of claim 11, further comprising displaying, via the controller management application, an alert in real time in response to receiving an indication of a fault condition from the brake controller.

20. A communication system comprising:

a controller management application operating on a mobile device, the controller management application configured to:

manage a profile comprising characteristics of a towed vehicle; and determine braking characteristics based on the profile to determine a transfer function; and a brake controller that controls a braking signal to brakes of the towed vehicle according to the transfer function, the brake controller including a wireless network controller to communicatively couple to the mobile device, wherein the controller management application is configured to display a representation of the braking signal received from the brake controller and a boost setting, and wherein the transfer function is automatically refined over time based on operating data obtained by the brake controller and saved in association with the selected one of the plurality of profiles for use in subsequent operations.

\* \* \* \* \*